(12) United States Patent
Hsu

(10) Patent No.: US 8,485,598 B2
(45) Date of Patent: Jul. 16, 2013

(54) PITCH ADJUSTING MECHANISM FOR BICYCLE SADDLE

(75) Inventor: Ching-Chung Hsu, Taichung (TW)

(73) Assignees: Flybikes S.L., Vigo (ES), part interest; David Quesada, Vigo (ES), part interest ( * ) Notice: Subject to any disclaimer, the term of this patent is extended or adjusted under 35 U.S.C. 154(b) by 146 days.

(21) Appl. No.: 13/199,716

(22) Filed: Sep. 7, 2011

(65) Prior Publication Data
US 2012/0126590 A1    May 24, 2012

(30) Foreign Application Priority Data

Nov. 18, 2010    (TW) ................ 99222405 U

(51) Int. Cl.
*B62J 1/00* (2006.01)
*B62J 1/08* (2006.01)
*B60N 2/40* (2006.01)

(52) U.S. Cl.
USPC ............... 297/215.15; 297/195.1; 297/215.13

(58) Field of Classification Search
USPC ............................ 297/195.1, 215.13, 215.15
See application file for complete search history.

(56) References Cited

U.S. PATENT DOCUMENTS

| | | | | | |
|---|---|---|---|---|---|
| 4,693,627 | A | * | 9/1987 | Borromeo | 297/215.15 X |
| 5,568,958 | A | * | 10/1996 | Chen | 297/215.15 |
| 5,855,410 | A | * | 1/1999 | Lin | 297/215.15 |
| 5,921,625 | A | * | 7/1999 | Muser | 297/215.15 |
| 7,559,604 | B2 | * | 7/2009 | Beaulieu | 297/215.15 |
| 2011/0241390 | A1 | * | 10/2011 | Tsai | 297/215.15 |

* cited by examiner

*Primary Examiner* — Rodney B White
(74) *Attorney, Agent, or Firm* — Charles E. Baxley

(57) ABSTRACT

A pitch adjusting mechanism for a bicycle saddle is arranged between a saddle and a seat post of the bicycle and includes: a base beneath the saddle; a connecting member being fixed to the seat post; a washer being removably assembled to a top or a bottom of the connecting member; and a fastener combining the connecting member, the washer and the base as a whole. When the washer is arranged on the top and beneath the bottom of the connecting member, a pitch of the saddle with respect to the seat post is different.

10 Claims, 6 Drawing Sheets

PITCH ADJUSTING MECHANISM FOR BICYCLE SADDLE

BACKGROUND OF THE INVENTION

1. Technical Field

The present invention relates to bicycle parts, and more particularly to a pitch adjusting mechanism for adjusting a pitch between a saddle and a seat post of a bicycle.

2. Description of Related Art

A saddle height adjusting mechanism is conventionally provided between a saddle and a frame of a bicycle for allowing a cyclist adjusting the height of the saddle depending on his/her physique. In addition, for countering a cyclist's natural upper-body inclination when he/she rides along steep slopes and thereby enabling him/her to maintain a proper riding posture that prevents muscle strains in the low back and ensures comfortable riding, some bicycles further include a saddle pitch adjusting mechanism for allowing adjustment of the saddle's pitch (vertical angle). However, the existing pitch adjusting mechanisms use either a pivot bolt or an arc saddle, and thus have difficulty in accurately controlling the extent of adjustment. Once a saddle is posed too standing, the external force applied thereto will be entirely put on the front end of the saddle, making the saddle tend to break, thereby decreasing its durability.

SUMMARY OF THE INVENTION

In view of the problem of the prior art, the present invention provides a pitch adjusting mechanism for a bicycle saddle. The pitch adjusting mechanism is arranged between a saddle and a seat post of the bicycle, and includes: a base being deposited at a bottom of the saddle and having a front socket and at least one rear socket, wherein the front socket has a downward-opened accommodating room that is formed with a vertically extending fixing hole and the rear socket is formed with at least one horizontally extending adjusting hole; a connecting member being fixed to the seat post and having a connecting portion and at least one tenon at two ends thereof for corresponding to the front socket and the rear socket, respectively, so that when the connecting member is assembled to the base, the connecting portion is received in the accommodating room and the tenon is swingably received in the adjusting hole, wherein the connecting portion is formed with a first through hole corresponding to the fixing hole; a washer being irremovably assembled to a top or a bottom of the connecting portion so as to be received in the accommodating room and abuts against the top or the bottom of the connecting portion, wherein the washer has a second through hole corresponding to the first through hole; and a fastener passing through the first through hole and the second through hole and being engaged with the fixing hole, so as to combine the connecting member, the washer and the base as a whole, wherein when the washer is arranged on the top and beneath the bottom of the connecting portion, a pitch of the saddle with respect to the seat post is different.

The primary objective of the present invention is to provide the washer with a horizontal surface and an inclined surface, so that the washer in a tapered shape when arranged at different locations can make the tenon swing in the adjusting hole in virtue of the arcuate surface, so as to provide fine adjustment of the pitch of the saddle with respect to the seat post.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawings, wherein.

DETAILED DESCRIPTION OF THE INVENTION

Figure 1:
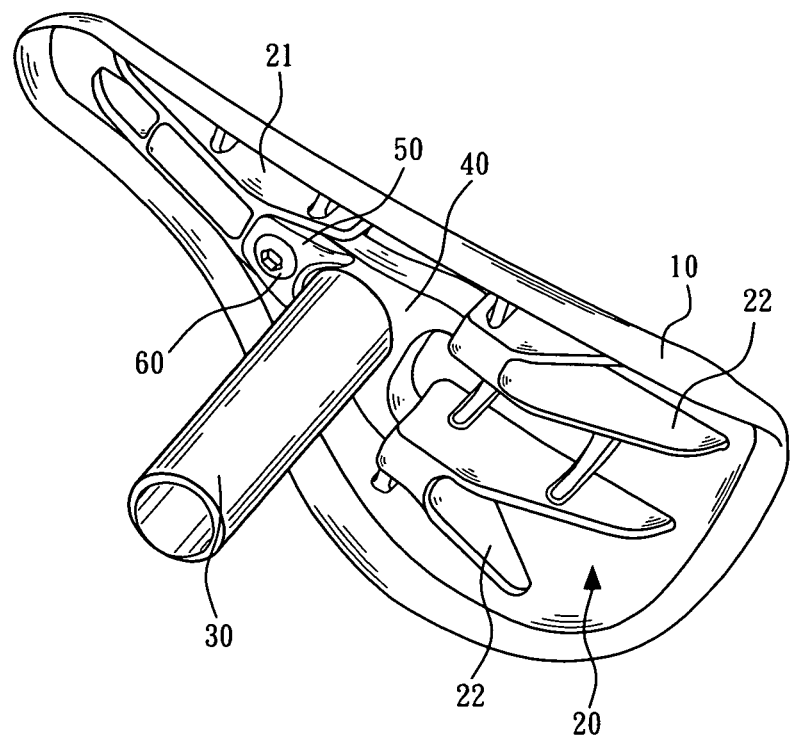
FIG. 1 is an upward perspective view of the pitch adjusting mechanism of the present invention posing a saddle at a first position.
Figure 2:
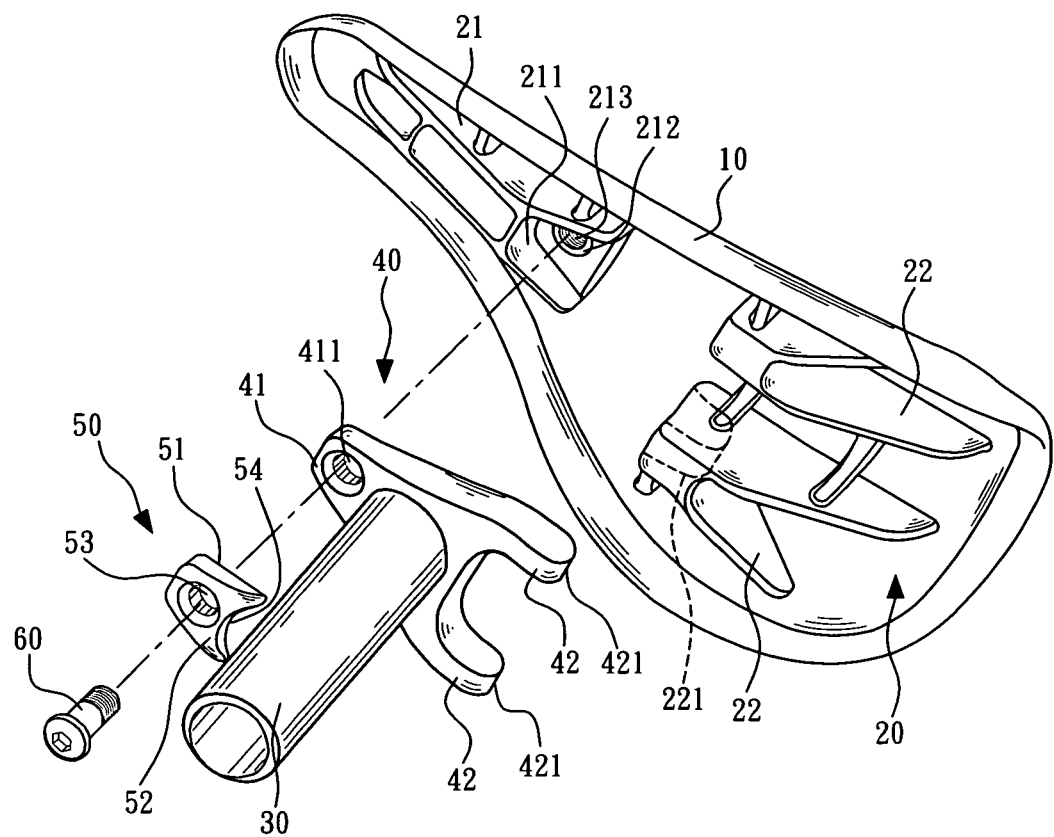
FIG. 2 is an exploded view of the pitch adjusting mechanism of FIG. 1.
Figure 3:
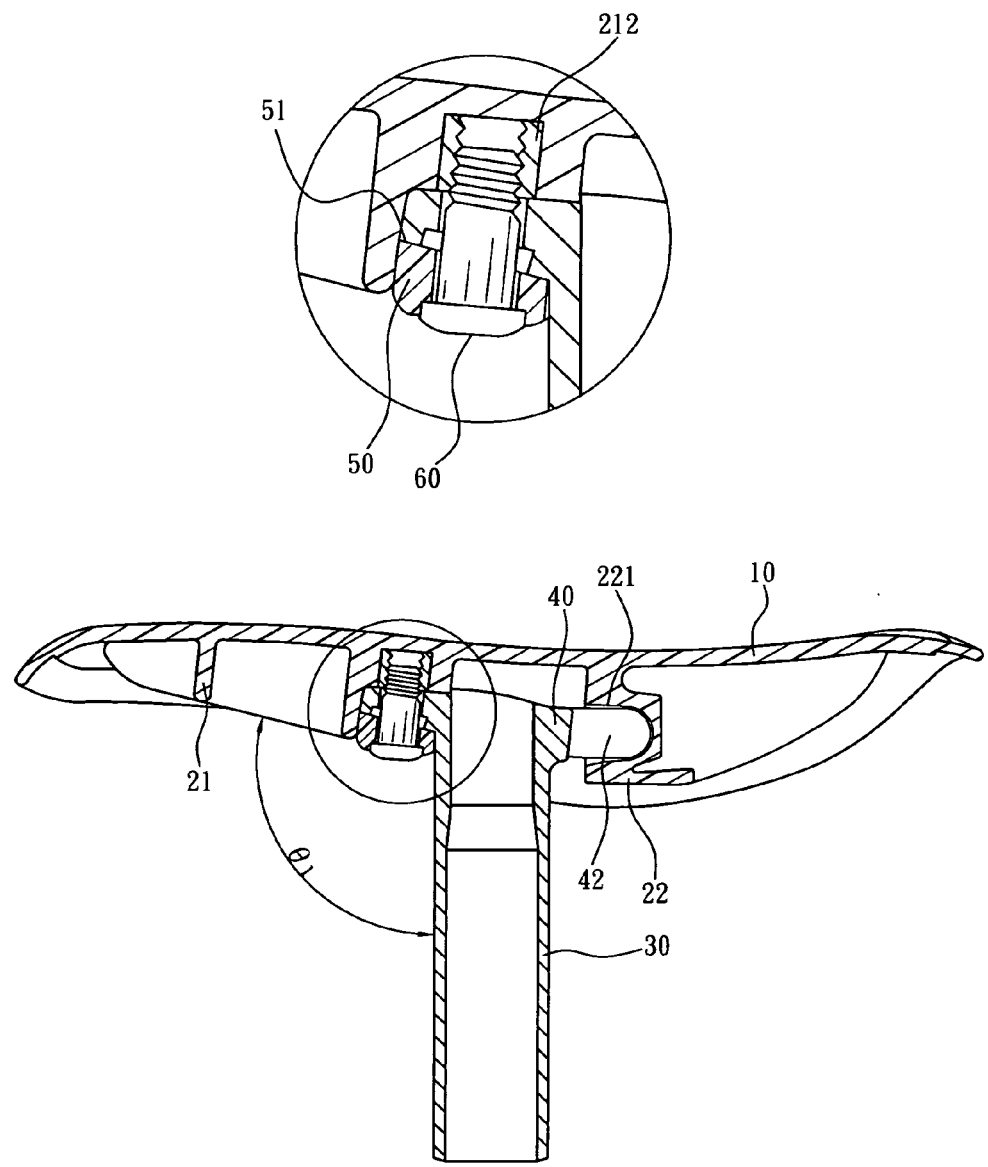
FIG. 3 is a cross-sectional view of the assembly of FIG. 1.

Referring to FIG. 1 through FIG. 3, according to the present invention, a pitch adjusting mechanism is provided between a saddle 10 and a seat post 30, for adjusting a pitch of the saddle 10 with respect to the seat post 30. The pitch adjusting mechanism primarily comprises a base 20, a connecting member 40, a washer 50 and a fastener 60.

The base 20 may be fixed to or formed integratedly on a bottom of the saddle 10 by any known means. The base 20 has a front socket 21 and two rear sockets 22. The rear sockets 22 are arranged abreast at two sides of the stern of the saddle 10 and form a triangle with the front socket 21. The front socket 21 has a downward-opened accommodating room 211, whose ceiling is formed with a vertically extending fixing hole 212 that includes a threaded section 213. Each of the rear sockets 22 has at least one adjusting hole 221 extending horizontally.

The connecting member 40 may be fixed to or formed integratedly on the seat post 30 by any known means. The connecting member 40 includes a connecting portion 41 and two tenons 42 corresponding to the front socket 21 and the rear sockets 22, respectively. The tenons 42 following the connecting portion 41 extend rearward and outward along two sides of the connecting portion 41, so that the connecting member 40 is essentially in an A-like shape. The connecting portion 41 is shaped to be fittingly received in the accommodating room 211. The connecting portion 41 has a first through hole 411 corresponding to the fixing hole 212. The tenons 42 are configured to be removably inserted into the adjusting holes 221, respectively. Each of the tenons 42 has its tail formed as an arcuate surface 421.

Figure 6:
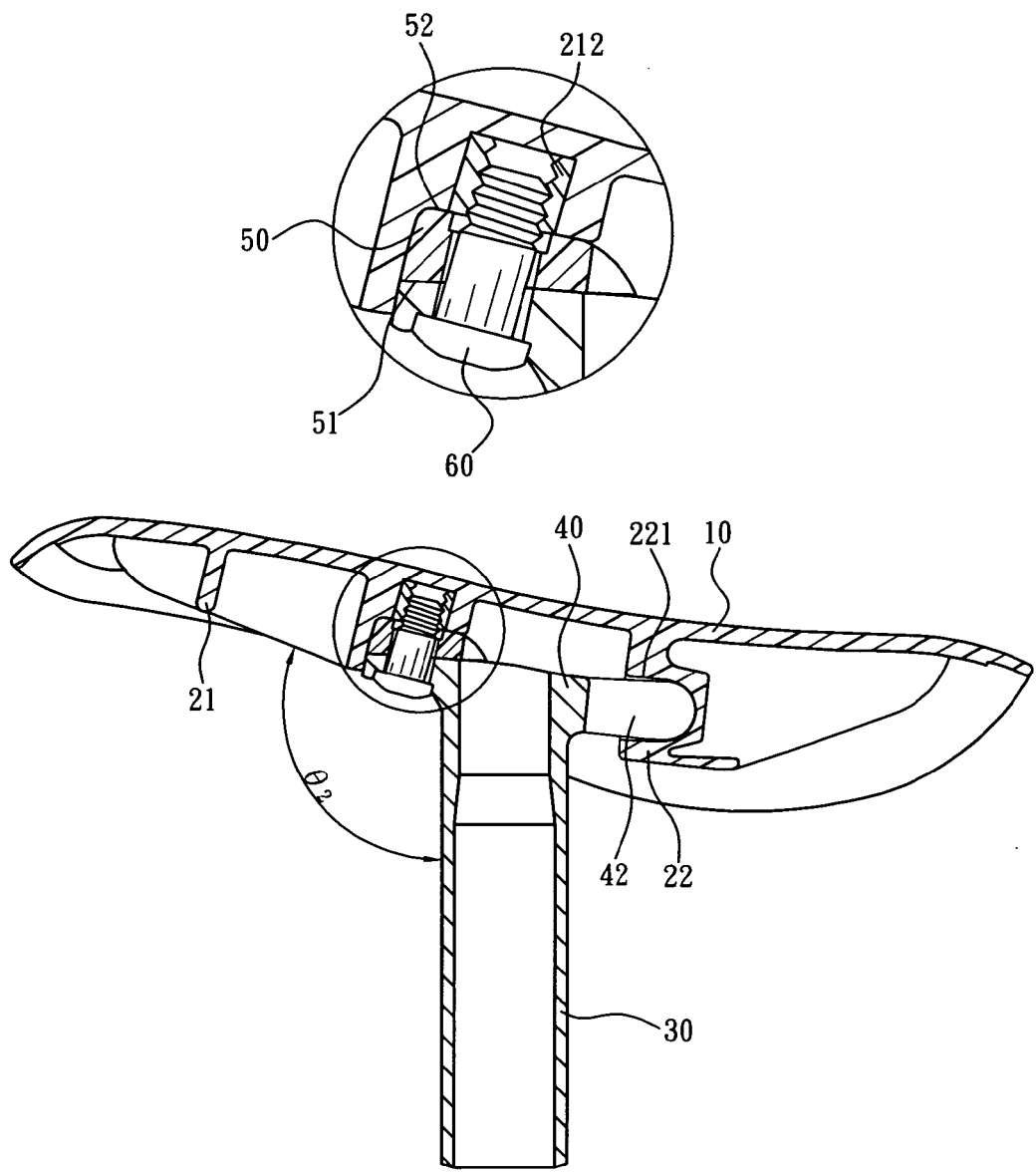
FIG. 6 is a cross-sectional view of the assembly of FIG. 5.

The washer 50 may be placed on or beneath the connecting portion 41 (as shown in FIG. 3 and FIG. 6), and matches the connecting portion 41 in terms of shape. The washer 50 is configured to be received in the accommodating room 211 for abutting against a top or a bottom of the connecting portion 41. The washer 50 has a horizontal surface 51 and an inclined surface 52, so the washer 50 is in a horizontally tapered shape. The inclined surface 52 is slightly curved. The washer 50 is formed with a second through hole 53 corresponding to the first through hole 411. The washer 50 has its tail formed with a concave 54.

The fastener 60 is configured to pass through the first through hole 411 and the second through hole 53 before being engaged with the fixing hole 212, so as to combine the connecting member 40, the washer 50 and the base 20 together.

With the components and configurations as described above, the following description will be focused on the operation and function of the present invention.

As shown in FIG. 2 and FIG. 3, when the fastener 60 passes through the connecting member 40 and the washer 50 to combine the connecting member 40 with the base 20, the tenons 42 are received in the adjusting holes 221, and the connecting portion 41 is received in the accommodating room 211, with the washer 50 placed beneath the connecting portion 41, so that the horizontal surface 51 of the washer 50 is adjacent to the bottom of the connecting portion 41 while the concave 54 abuts against the seat post 30. At this time, the saddle 10 and the seat post 30 include an angle θ1. In the case that the base 20 at the bottom of the saddle 10 is made of plastic, a metal nut may be inlaid in the fixing hole 212 for forming the threaded section 213 and ensuring reliable and durable combination between the base 20 and the fastener 60.

Figure 4:
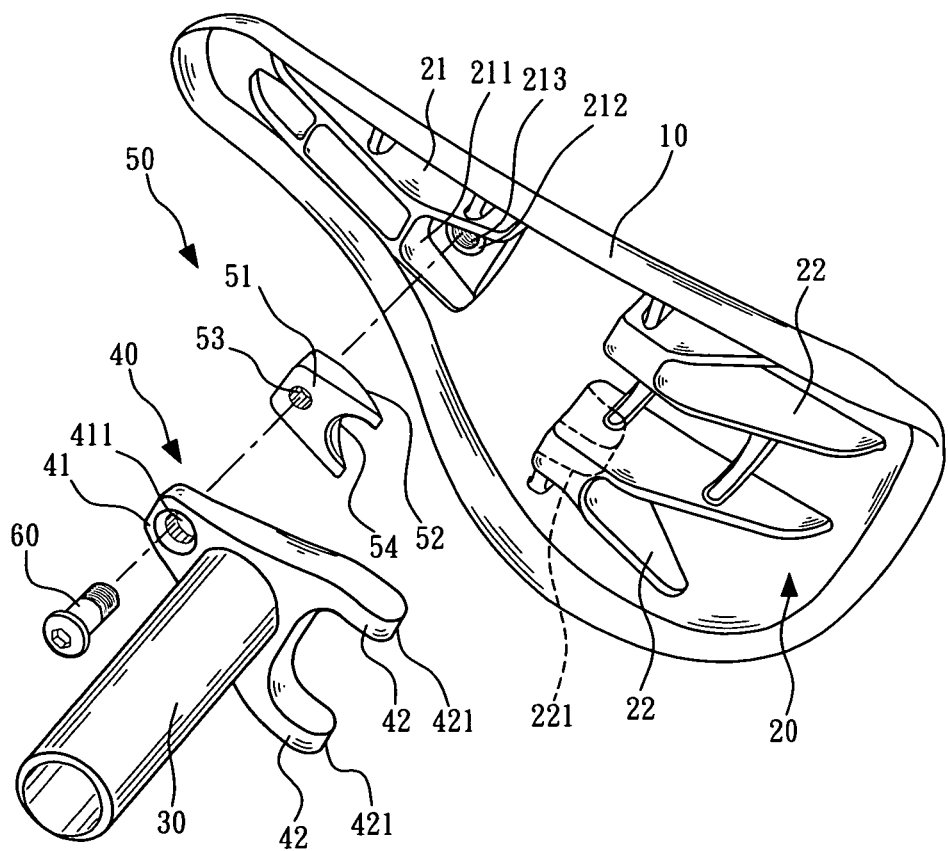
FIG. 4 is an exploded view of the pitch adjusting mechanism posing the saddle at a second position.
Figure 5:
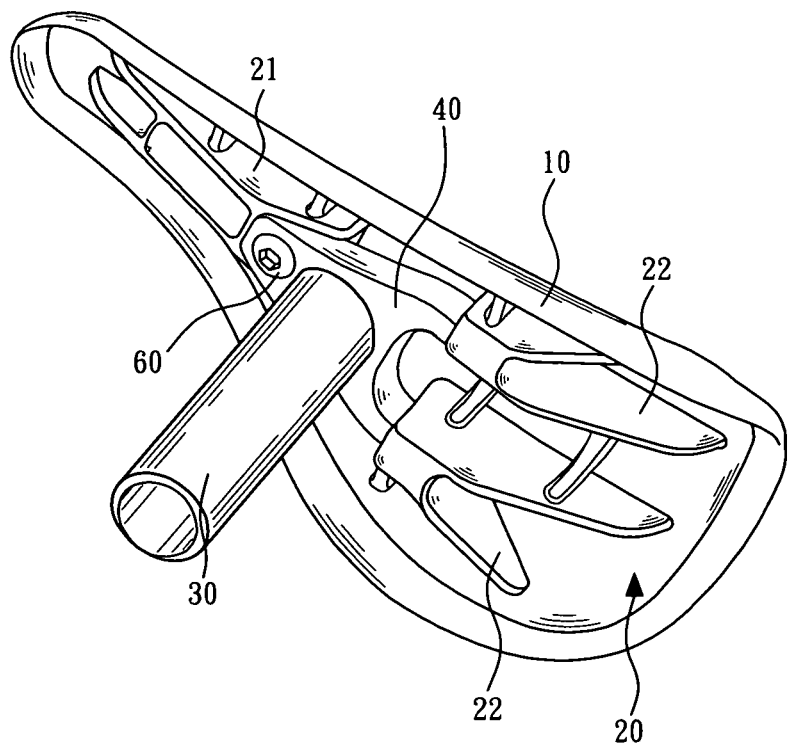
FIG. 5 is an upward perspective view of the pitch adjusting mechanism posing the saddle at the second position.

Referring to FIG. 4 and FIG. 5, when it is desired to change the pitch of the saddle 10 with respect to the seat post 30, the components are disassembled in an order reverse to that for assembling them. Then the washer 50 is placed on the connecting portion 41. In other words, the washer 50 is placed between the base 20 and the connecting member 40, so that the inclined surface 52 of the washer 50 abuts against the ceiling of the accommodating room 211 while the horizontal surface 51 lies on the top of the connecting portion 41. The tenons 42 of the connecting member 40 are received in the adjusting hole 221. At this time, the inclined surface 52 serves to prop up the saddle 10. Due to the arcuate surface 421 of each of the tenons 42, the tenons 42 are able to swing inside the adjusting holes 221 in response to the angular change of the saddle 10. After the fastener 60 is assembled to combine the components arranged as described above, the saddle 10 and the seat post 30 include an angle θ2 therebetween, and the saddle 10 is backward inclined, as shown in FIG. 6.

Meantime, the inclined surface 52 of the washer 50 can fully control the pitch of the saddle 10 with respect to the seat post 30 within a predetermined extent, so the saddle 10 will not be over-inclined. When the washer 50 is arranged between the base 20 and the connecting member 40, since the inclined surface 52 is slightly curved, the washer 50 can fit any of the base 20 and the connecting member 40 that it contacts because the curved surface can offset any interface inaccuracy and ensure the close match. Thus, the inclined surface 52 can facilitate the installation of the washer 50 and ensure stable combination between the components.

The present invention has been described with reference to the preferred embodiment and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A pitch adjusting mechanism for a bicycle saddle, the pitch adjusting mechanism being arranged between a saddle and a seat post of the bicycle, and comprising:
   a base being deposited at a bottom of the saddle and having a front socket and at least one rear socket, wherein the front socket has a downward-opened accommodating room that is formed with a vertically extending fixing hole and the rear socket is formed with at least one horizontally extending adjusting hole;
   a connecting member being fixed to the seat post and having a connecting portion and at least one tenon at two ends thereof for corresponding to the front socket and the rear socket, respectively, so that when the connecting member is assembled to the base, the connecting portion is received in the accommodating room and the tenon is swingably received in the adjusting hole, wherein the connecting portion is formed with a first through hole corresponding to the fixing hole;
   a washer being removably assembled to a top or a bottom of the connecting portion so as to be received in the accommodating room and abuts against the top or the bottom of the connecting portion, wherein the washer has a second through hole corresponding to the first through hole; and
   a fastener passing through the first through hole and the second through hole and being engaged with the fixing hole, so as to combine the connecting member, the washer and the base as a whole,
   wherein when the washer is arranged on the top and beneath the bottom of the connecting portion, a pitch of the saddle with respect to the seat post is different.

2. The pitch adjusting mechanism as claimed in claim 1, wherein two said rear sockets are provided abreast at a rear portion of the saddle.

3. The pitch adjusting mechanism as claimed in claim 2, wherein the connecting member has two said tenons that extend rearward along two sides of the connecting portion.

4. The pitch adjusting mechanism as claimed in claim 1, wherein the fixing hole has a threaded section that is made by inlaying a metal nut into the fixing hole.

5. The pitch adjusting mechanism as claimed in claim 1, wherein the tenon has a tail thereof formed with an arcuate surface.

6. The pitch adjusting mechanism as claimed in claim 1, wherein the washer has a horizontal surface and an inclined surface, so that the washer has a horizontally tapered shape.

7. The pitch adjusting mechanism as claimed in claim 6, wherein when the washer is arranged beneath the bottom of the connecting portion, the horizontal surface abuts against the bottom of the connecting portion.

8. The pitch adjusting mechanism as claimed in claim 6, wherein when the washer is arranged on the top of the connecting portion, the horizontal surface abuts against the top of the connecting portion.

9. The pitch adjusting mechanism as claimed in claim 6, wherein the inclined surface is curved.

10. The pitch adjusting mechanism as claimed in claim 1, wherein the washer has a concave for fittingly contacting the seat post.

* * * * *